Aug. 20, 1929.   P. J. CHAPPELLE   1,725,618
CLARIFIER
Filed Aug. 1, 1927

Peter J. Chappelle
INVENTOR

BY Victor J. Evans
ATTORNEY

WITNESS:

Patented Aug. 20, 1929.

1,725,618

UNITED STATES PATENT OFFICE.

PETER J. CHAPPELLE, OF HELENA, MONTANA.

CLARIFIER.

Application filed August 1, 1927. Serial No. 209,935.

The object of this invention is to provide a clarifying or filtering device especially useful for purifying gasoline, but adapted for clarifying or purifying water and other liquids,—the device including a plurality of basket-like elements each carrying on its inner surface a filtering element, the baskets being nested and the filtering elements of felt or the like being of gradually increasing degrees of porosity, from the outer member to the inner member, and means being provided for producing centrifugal action in addition to gravity flow.

A further object is to provide a particular assembly of elements including an outer container, and a plurality of elements of perforated material, or of wire mesh, adapted to carry a filtering medium, these elements, or some of them, including upper flanges constituting supporting members and permitting the devices to be spaced in such manner as to produce the best results, the final discharge of fluid being to an outer container having communication with a discharge pipe.

With the foregoing and other objects in view, the invention consists in the novel construction and arrangement of elements described, illustrated and claimed, it being understood that modifications may be made within the scope of the claim without departing from the spirit of the invention.

In the drawings forming part of this application,

Figure 1:
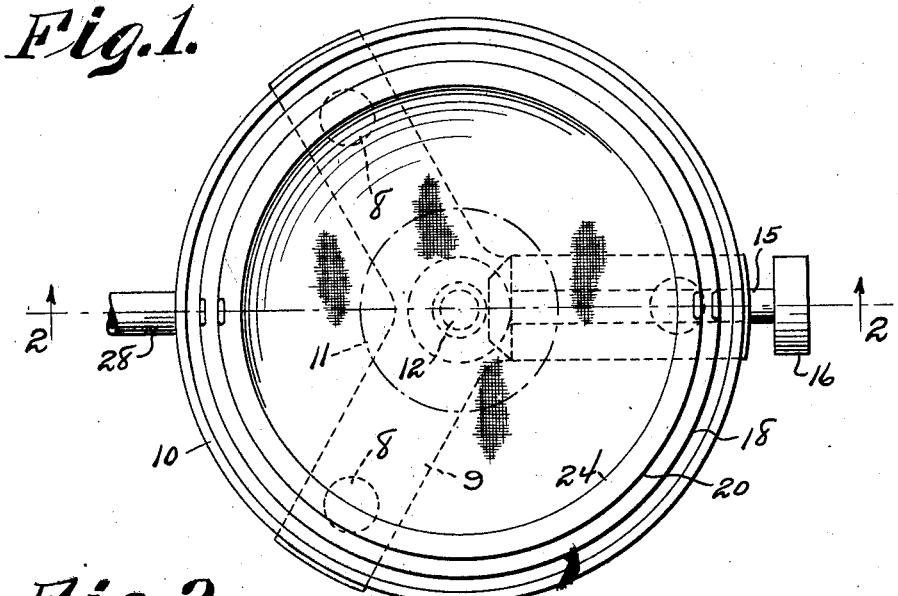
Figure 1 is a view of the device in top plan.
Figure 2:
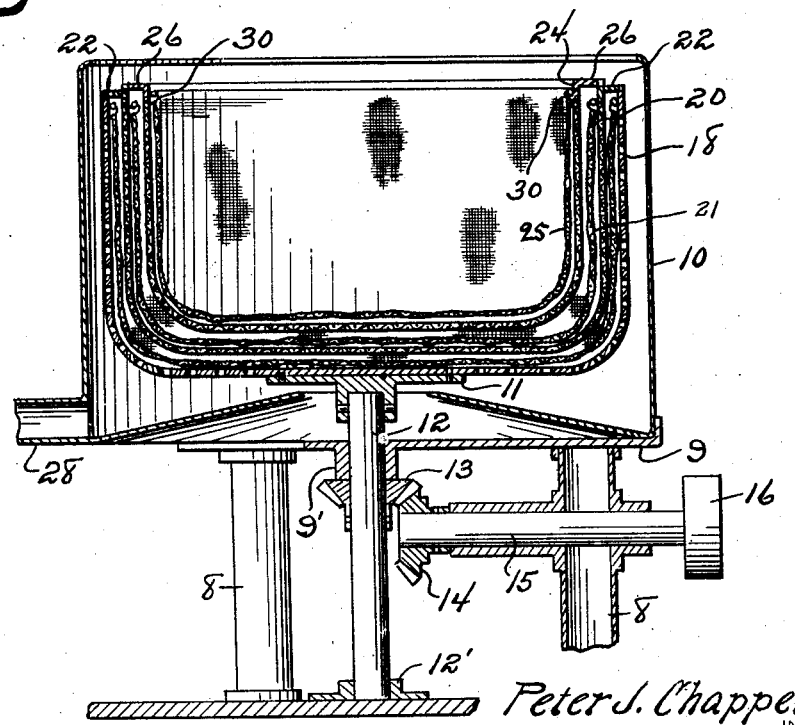
Figure 2 is a view in vertical section, the section being on line 2—2 of Figure 1.

The container 10 may be of copper, or other suitable material, and a rotatable basket therein is mounted on a central support 11, which in turn is rigidly carried by vertical shaft 12. Mounting means for container 10 may include standards 8 and a spider 9 providing a bearing 9' for shaft 12 having its lower end mounted as shown at 12'. Shaft 12 has a bevel gear wheel 13 rigidly mounted thereon, this wheel meshing with a gear wheel 14 rotating with horizontal shaft 15. The shaft last named carries a pulley wheel 16, and it is the intention that the rotating element of the clarifying or filtering device shall be operated at a speed of about five hundred revolutions per minute.

Within the container 10 is an annular element 18, which may be of perforated metal, or of wire mesh, and this element 18 carries on the inner surface thereof a layer of filtering material, felt or the like being suitable for the purpose. Concentrically mounted within element 18 is a basket or the like 20 mounting a layer of filtering material 21, and this element 20 carries on its upper edge an outwardly extending flange 22 adapted to engage the upper edge of the element 18.

An inner basket or the like 24 mounts or carries a layer of filtering material 25, and includes an upper flange 26 adapted to rest on or if desired to be secured to flange 22. The filtering element 25 is of relatively coarse texture, but will remove the larger particles of foreign material. The intermediate layer of filtering material is of finer texture, and the outer filtering element is of still finer texture, and is designed to remove any particle of foreign material remaining after the fluid passes thru the inner and intermediate layers.

In the use of this device reliance is placed both upon gravity flow and upon centrifugal action, and the fluid is introduced thru a pipe, not shown, which will extend into the upper portion of the device, and the gasoline or other fluid may be sprayed thru lateral apertures in the pipe, so as to come into direct contact with the inner filtering element. The fluid will pass thru the various layers, under centrifugal action, and also under action by gravity, and will be received within the container 10 from which it flows thru discharge pipe 28. Hooks such as 30 project inwardly from the various baskets and serve to mount the fibrous material.

Having described the invention what is claimed is:—

A filtering device, comprising a plurality of concentrically arranged elements having openings therethru and having flanged engagement at their upper edge portions, members of fibrous material carried by the side and bottom walls of said elements, said fibrous material at the bottom being disposed between the relatively stiff lower walls of the concentric elements, means for imparting rotary movement to the outer element, and a container for receiving and discharging fluid filtered thru the fibrous members.

In testimony whereof I affix my signature.

PETER J. CHAPPELLE.